June 3, 1952 — R. F. TATOM — 2,599,079
SEAT POSITION LOCK
Filed Sept. 27, 1948 — 3 Sheets-Sheet 1

INVENTOR.
RAYMOND F. TATOM
BY
Reynolds & Beach
ATTORNEYS

June 3, 1952 R. F. TATOM 2,599,079
SEAT POSITION LOCK
Filed Sept. 27, 1948 3 Sheets-Sheet 2
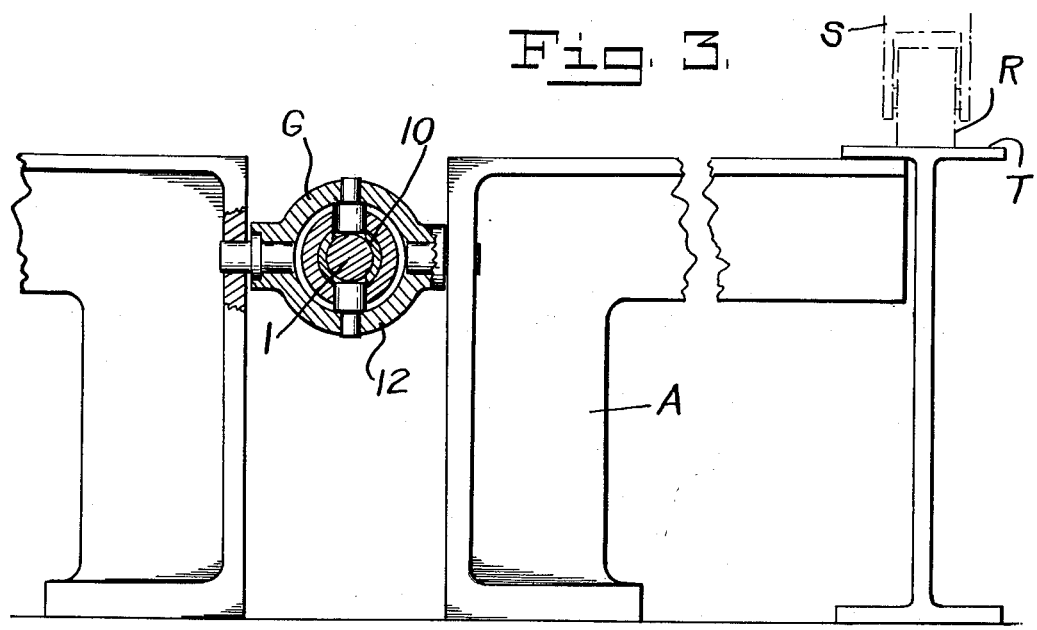
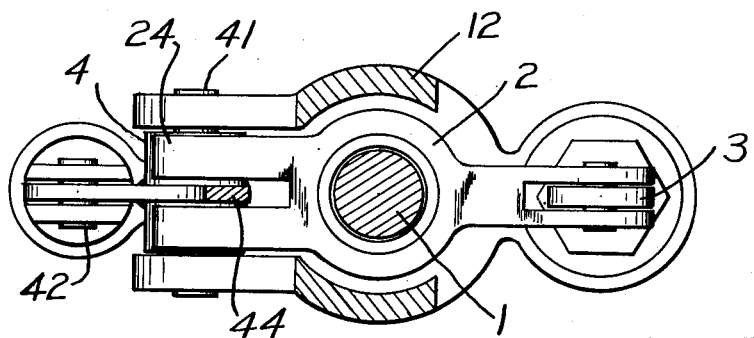
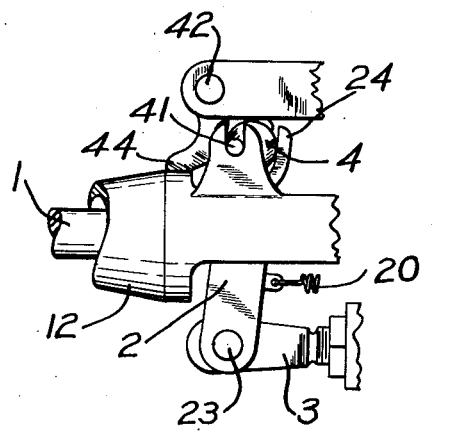
INVENTOR.
RAYMOND F. TATOM
BY
Reynolds & Beach
ATTORNEYS

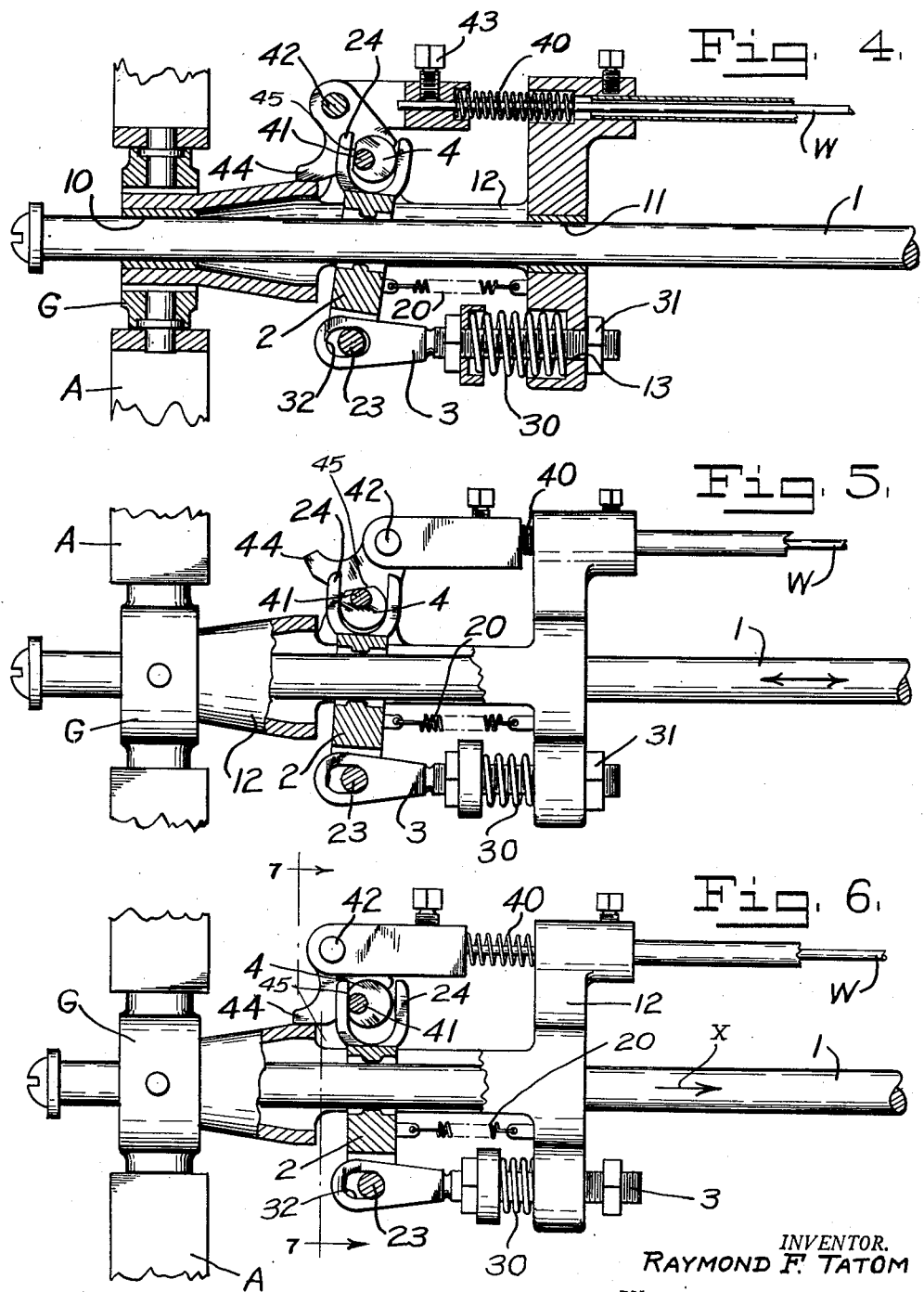

Patented June 3, 1952

2,599,079

UNITED STATES PATENT OFFICE

2,599,079

SEAT POSITION LOCK

Raymond Fred Tatom, Puyallup, Wash., assignor to Boeing Airplane Company, Seattle, Wash., a corporation of Delaware Application September 27, 1948, Serial No. 51,429

11 Claims. (Cl. 188—67)

Reclining chairs upon vehicles, such as airplanes, must be readily adjustable by the occupant to various different positions, from upright to full reclining, yet must automatically remain in any adjusted position notwithstanding shocks or other forces applied to it, due for instance to movement of the vehicle or of the occupant.

Seat positioning and locking means are known which will enable the occupant by operation of a simple control device to adjust the seat to any desired position, and upon his release of such device to retain the seat in such adjusted position. Ordinarily, however, such seat positioning means can only be released by again manipulating the occupant's control device. This control device is located conveniently to a seated occupant, but is not readily reached or manipulated by a person standing near by or walking past. At times it is desirable that the seat elements be easily movable to their upright positions by an attendant walking past the seats, and without the necessity of such attendant pausing to reach down and release the lock of each individual seat, at such a time for instance as when the vehicle is unoccupied, and it is desired to tidy it up or to clean it out. More particularly it is desirable, in seats having the capability of ready adjustment by the occupants, and of retention in any adjusted position, to enable the stewardess, merely by walking forwardly along the aisle, and by pressing lightly forwardly on the backs of any seats that may be in reclining position, to adjust these seats to their upright positions, thereby giving to the cabin an appearance of neatness and uniformity. The accomplishment of the ends inidcated is a primary object of the present invention.

It is a further object of the present invention to employ seat positioning and locking means of known type, but to incorporate therewith in simple manner further mechanism enabling the positioning of the seats in upright position from a more greatly reclining position merely by light forward pressure on the back of the seat, or similar manipulation of a seat element.

It is an object, in mechanism wherein the seat is locked in various adjusted positions by a fixedly located cramping lever acting upon a rod shiftable lengthwise in accordance with adjustment of the seat, to provide means acting positively with predetermined force to move the cramping lever into rod-locking position, yet to allow sufficient freedom of movement or lost motion between the cramping lever and the means whereby its movement is effected, to enable the cramping lever automatically to lock the rod even more securely under the influence of forces generated by the shifting about of the chair's occupant; additionally, it is another object to provide mechanism of this sort wherein release of the lock is not ordinarily accomplished merely by bottoming of the lost-motion means, but only upon application of additional force after bottoming, sufficient to overcome a resilient force of predetermined value.

A still further object of the invention is to provide mechanism to the ends already indicated, which shall be simple, rugged, and dependable, which adds but little to the weight of the airplane, and which involves no additional problems of installation or installation cost, nor of servicing.

With these objects in mind, and others as will appear more fully hereinafter, the present invention comprises the seat position lock herein shown and hereinafter described and claimed, and the novel combination thereof with the seat and its supporting framework, all to the ends indicated above.

In the accompanying drawings the invention is illustrated in a practical form, but it will be understood that the particular form, details, and nature of the individual parts, and to a certain degree their relationship to one another, may be varied in accordance with the principles of the invention as hereinafter made clear, yet without departing from the spirit of that invention.

Figure 3 is a transverse sectional view at the point of securement of the seat position lock to the framework.

Figures 4, 5, and 6 are similar views, generally in plan, but partially in section, illustrating three different operative relationships of the parts of the mechanism.

Figure 7 is a transverse sectional view, the viewpoint being indicated by the line 7—7 of Figure 6, and the position of the parts corresponding to their positions in Figure 6.

Figure 8 is in general a plan view of the parts in the position represented in Figure 4.

Figure 1:
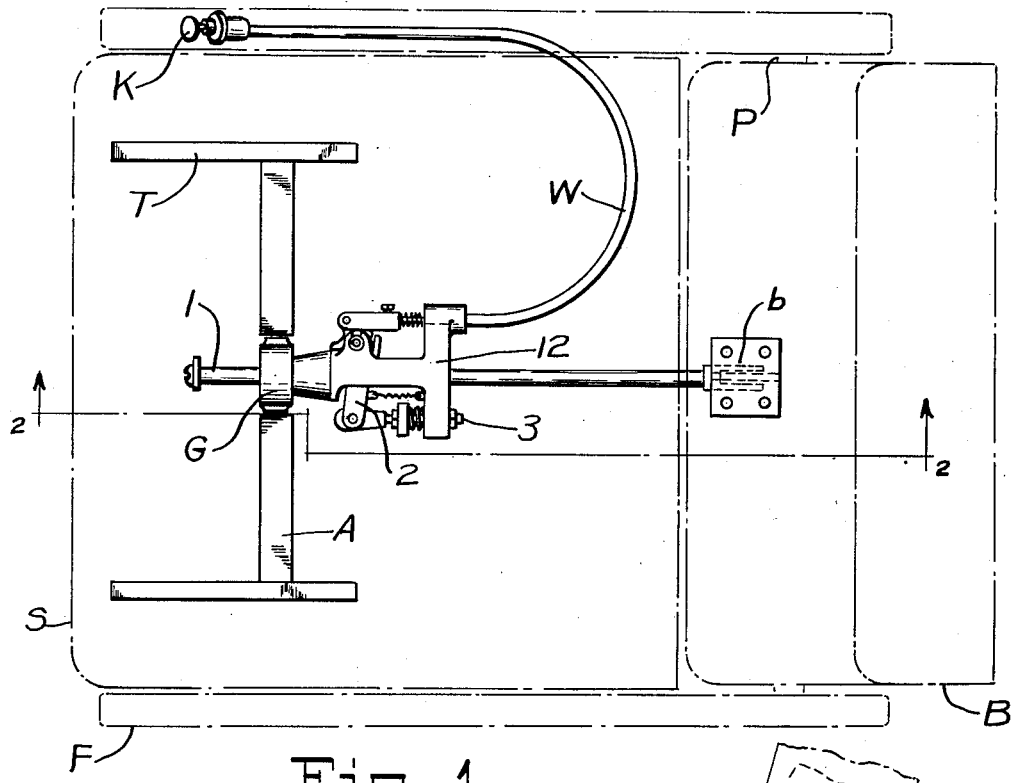
Figure 1 is a plan view of such a seat, the seat and its framework being in shadow view, and the seat position lock mechanism alone being in full lines.
Figure 2:
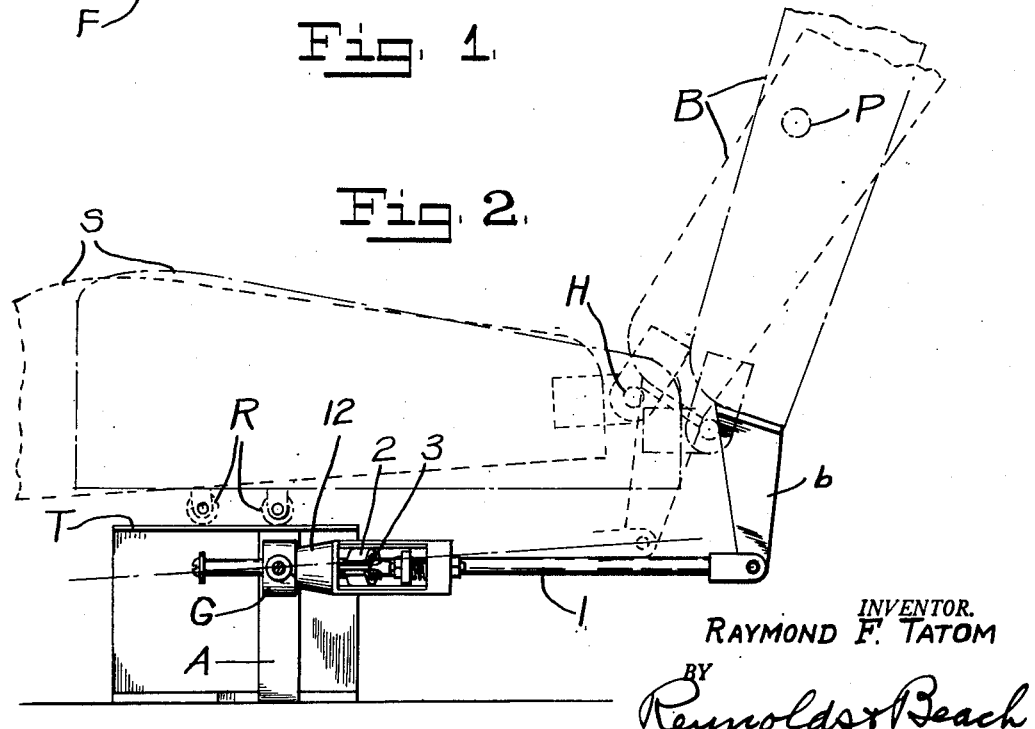
Figure 2 is in effect a section through the same at the plane indicated by the line 2—2 in Figure 1.

As representative of a suitable seat with which such a seat position lock may be operatively associated, the seat is shown in Figures 1 and 2 as comprising a seat frame and cushion S, a back element B, and frame mechanism indicated at F and at A. These frame elements may be supported upon the floor or fixed to any other suitable support. The seat and back are hingedly connected, as at H, and the back is pivotally mounted as at P to the framework. The seat element S is conveniently supported near its forward edge by rollers R running upon longitudinally disposed tracks T which in effect constitute part of the framework A.

By the arrangement described, or by any equivalent arrangement, the seat will slide forwardly as the back tilts rearwardly, and the two tend to come more nearly into a common horizontal plane. Conversely, as the seat is tilted more nearly upright the seat slides rearwardly and drops downwardly at its rear edge, as comparison of the dash line and dot-dash line positions of Figure 2 will show.

Positioning of the seat elements in any such position is controlled by the occupant through convenient mechanism, such as the Bowden wire W extending from a button or control knob K at a convenient point on the frame F, to mechanism which is about to be described, and which is located in this instance beneath the seat element S, but which may be operatively connected to the back B by means of a rod 1 connected at its rear end to the back B or to a bracket b which depends beneath the back.

The rod 1 is guided for movement in the direction of its length at 10 and 11 in a fitting generally indicated by the numeral 12. This fitting is preferably mounted through the medium of a universal or gimbal mount G in the frame A. So supported and guided, the rod 1 moves coincidentally with tilting movement of the seat. As the seat tilts the more toward reclining position the rod 1 moves forwardly, and as the seat moves more toward the upright position the rod moves rearwardly. By fixing the rod in position it follows that the seat is correspondingly fixed in position.

The rod can be secured in position by means of a cramping lever 2, which in effect is a lever with a hole through which the rod extends, the hole being slightly oversize, so that when the cramping lever is generally perpendicular to the rod, the rod may run freely through it, but when the cramping lever 2 is appreciably inclined relative to the rod it engages and binds or cramps the rod at the two opposite sides, and thereby holds the rod against movement in the direction of its own length in either sense. The cramping lever may be considered as normally fulcrumed at a substantially fixed fulcrum represented by the pin 23, received within a slot 32 which extends lengthwise of a stud 3. During the releasing action the pin is bottomed at one end of this slot 32, but at certain other times it is not, as will appear hereafter. The stud is guided at 13 in the fitting 12, so that it may move parallel to the rod 1 to a limited extent. The stud is yieldingly urged in one sense by compression spring means represented at 30, and its movement in this sense is limited by a stop nut or similar stop element 31.

The spring 30 may be considered as sufficiently strong that under normal operating conditions it will maintain the stud 3 in a fixed position, where its stop 31 is bottomed, and a lighter spring 20 will tend to maintain the pin 23 at the bottom or right-hand end of the slot 32, but as viewed in Figure 3, the weight of the occupant upon the back B has urged the rod 1 forwardly, and the pin 23 which was bottomed at the right end of the slot 32 during the mechanical cramping operation has been shifted to the left, further cramping the lever, without disturbing the fixity of the fulcrum 23, 32.

At the opposite end the cramping lever 2 is engaged by means operable by the occupant at K through the Bowden wire W to swing the cramping lever, when a change of position is desired, more nearly into a position perpendicular to the rod 1, and operable also upon release of the operating device K by the occupant to automatically return the cramping lever to its inclined rod-secured position. Any suitable means to that end may be employed, and it is to be understood that the mechanism about to be described is merely representative of any other equivalent or suitable mechanism that may be employed. For example, an eccentric or cam 4 is pivotally mounted at 41 in the fitting 12, and the cam 4 is thereby received and held in the bifurcated end 24 of the cramping lever 2, and by its oscillation about its supporting center 41 may rock the cramping lever 2, between rod-secured and rod-released positions. The cam member 4, by a connection at 42, outwardly from the pivot center 41, is operatively connected to the end of the Bowden wire W, as for instance by means of the set screw 43, and a compression spring 40 acts thereon, tending to rotate the cam member 4 into the position of Figure 4, which corresponds to rod-secured position. A stop finger 44, engageable with the fitting 12, limits such rocking movement. The cam 4 has a flat 45 for a purpose which will shortly appear.

It is clear that with parts in the position of Figure 4, which is the normal rod-secured or seat-locked position, the rod 1 is held immovably against movement to the left in the figure, in the sense of downward swinging of the seat back, by reason of the inclined or cramped position of the cramping lever 2. The spring 40, acting upon the cam member 4, had tilted the cramping lever 2 about its fixed pivot 23, to move and to retain parts in this position, and the normal effect of the weight or pressure of the occupant against the back B, tending to shove the rod 1 forwardly, has only accentuated the cramping action, by shifting the pin 23 to the left in its slot 32, and has thus cramped parts the more tightly. Any such forward or leftward movement of the pin 23 is about the cam 4 as a fulcrum, and is accomplished in opposition to the light spring 20. The spring 30 has no part in this latter action, since its function is merely to hold the stud 3 and its slot 32 fixed in position as a fulcrum, about which the cramping lever 2 may swing.

Whenever the occupant of the seat desires to change his position, whether to tilt the seat more greatly toward reclining position, or more greatly toward upright position, he has only to manipulate the knob K, and thereby to pull upon the Bowden wire W, which will rotate the cam 4, in a manner shown in Figure 5, and in opposition to the spring 40, thereby once more bottoming the pin 23 at the right-hand end of the slot 32, and swinging the cramping lever 2 about this pin 23 as a fulcrum into a position more nearly perpendicular to the rod 1. In this more or less perpendicular position the cramping or wedging action is released, and the rod 1, under control of its connection to the seat elements themselves, may slide forwardly or rearwardly as the occupant chooses. Once the desired new position is attained, the operating device at K is released, and extension of the spring 40 restores parts to the normal rod-secured position of Figure 4, except as the pin 23 would be bottomed at the right end of slot 32. This is the normal manner of operating the device. The spring 30 still has had no operative function. It will be clear, however, that without more than this, it would be always necessary to release the rod by operation of the control device at K before the seat could be shifted into upright position.

But now if it is desired to urge the seat to its upright position merely by pressure upon the back, this pressure upon the back acts upon the rod 1, tending to move the rod to the right as viewed in Figure 6, or in the direction of the arrow X. Now, through the cramping interengagement between the rod 1 and the cramping lever 2, the tendency is to move the cramping lever 2 at first bodily to the right. Its upper end may not move farther to the right than the limited distance that may be allowed by the flat 45, being held by the cam 4. Its pin 23, however, can bottom in the slot 32, and the force is thereby transmitted from the rod 1 through the still-cramped lever 2 to the stud 3, and if sufficient force is applied, the spring 30 will be compressed, in the manner indicated in Figure 6, and thereby the cramping lever 2 may swing, but now about its cam 4 as a fulcrum, into a nearly perpendicular position with respect to the rod 1. Regardless of how the cramping lever attains this relatively perpendicular position, whenever it is in or near that position its engagement of the rod 1 is released, and now the rod is free to slide in the sense of the arrow X. Because of the very considerable mechanical advantage of the seat elements themselves, only a small amount of force applied forwardly to the upper end of the back B is needed to move the seat parts into their upright amount, but no ordinarily exerted amount of pressure on the upper edge of the back in the opposite sense—that is, tending to move it into a reclining position—will effect such movement, because the action is then merely to cramp the cramping lever 2 the more tightly upon the rod 1.

Whenever the seat has been thus moved by pressure upon its back into upright position the displacing force on the rod 1 ceases, the spring 30 expands again, and once again causes cramping of the lever 2 upon the rod, to retain parts in their attained upright position. The seat is again ready for occupancy, and for adjustment by release of the cramping lever through the medium of the control member K, in a manner already described.

The flat at 45 serves a function only when the back is shoved forwardly by hand. If the seat's mechanical advantage is large, any such forward shoving, reacting as a pull to the right on rod 1 and tending to rotate lever 2 at once about cam 4, would immediately release the binding of the lever 2 upon the rod, taking up the slight slack in the slot 32, before any compression of spring 30 occurs. It is preferable that such slippage occur only after some predetermined force, not likely to be accidental, is applied to the back to compress spring 30 by some amount. If a pull to the right (arrow X) on rod 1 will bodily shift lever 2 to the right until pin 23 bottoms in slot 32, and not until then will create a moment about cam 4, such result can be achieved. That result follows from the use of the flat 45, so located that in the cramped position of Figure 5 the lever 2 must move bodily to the right before such dextral movement tends to rotate the lever about the cam 4; thereafter further movement, accompanied by compression of spring 30, is necessary before the lever's grip on rod 1 is released.

I claim as my invention:

1. A locking mechanism comprising, in combination, a rod movable lengthwise, a cramping lever engageable at an intermediate portion thereof with opposite sides of said rod when disposed in one angular position relative thereto, to retain the rod against lengthwise movement in either sense relative to said lever, but disengageable to enable lengthwise relative movement of the rod when swung into a different angular position relative thereto, means operatively engaged with one end of said cramping lever to constitute a normally substantially fixed fulcrum therefor, lever shifting means forming a second lever fulcrum and operatively engaged with the opposite end of said cramping lever and movable to shift the cramping lever about such normally fixed fulcrum into and from rod-retaining position, but itself normally maintained in rod-retaining position, means operable at will to move the shifting means, and thereby the cramping lever, into rod-released position, to enable lengthwise movement of the rod, means guiding said normally fixed fulcrum for movement in a direction permitting swinging of said lever about said second lever fulcrum into rod-releasing position, and means normally retaining said normally fixed fulcrum against such movement but yieldable to permit such movement thereof in response to a predeterminated external force in one sense on the rod which, through said lever, exerts a force on said normally fixed fulcrum, to release the rod for movement in such latter sense.

2. Locking mechanism as in claim 1, including spring means biasing the shifting means to maintain the latter yieldably in rod-retaining position.

3. Locking mechanism as in claim 1, wherein the shifting means includes limited lost-motion means enabling final cramping movement of the lever independently of the shifting means, under the influence of external forces applied to said rod.

4. Locking mechanism as in claim 1, wherein the normally substantially fixed fulcrum includes limited lost-motion means enabling movement of the lever's end engaged thereby in a direction, relative to such fixed fulcrum, generally opposite from that in which the latter moves to permit rod-releasing swinging of the lever, thereby enabling final cramping movement of the lever by swinging of said lever about the second fulcrum effected by force on the rod.

5. Locking mechanism as in claim 4, including also limited lost-motion means between the lever and its shifting means, operative in the sense opposite to the lost-motion means of the fixed fulcrum, for enabling rod-effected bodily shifting of the lever without appreciable swinging thereof, in the direction of rod-release, until lost motion is taken up in the fixed fulcrum lost-motion means, whereby a further movement of the rod in the same direction causes yielding of the retaining means and rod-releasing swinging of the lever.

6. Locking mechanism as in claim 5, including further spring means biased to tend to take up the lost motion of the lost-motion means of the fixed fulcrum by exerting a force on the cramping lever to urge it towards rod-released position.

7. The locking mechanism defined in claim 1, wherein the shifting means comprises a cam engaged in a slot in the said opposite end of the lever, and rotatable in said slot to swing the lever into and from rod-engaging position, said cam acting as fulcrum for such end of the lever.

8. Locking mechanism comprising a cramping lever and a rod movable lengthwise therethrough, and secured or released by said cramping lever as the latter is inclined or is more nearly perpendicular to the rod, respectively, means operable at will to swing one end of said lever about its opposite end and lengthwise of the rod, between rod-secured and rod-released positions, and yieldingly biased to remain in rod-secured position, a normally substantially fixed fulcrum engaged with the opposite end of said lever and resilient means yieldably supporting said fulcrum in its normal position, but yieldable under the influence of a predetermined force transmitted from the rod through the lever, to displace said fulcrum and thereby to swing the lever about the normal lever-shifting means towards its more nearly perpendicular rod-releasing position.

9. The locking mechanism defined in claim 7 wherein the width of the slot is greater than the width of the cam engaging the same when such cam occupies its rotated position corresponding to rod-engaging position of the cramping lever, thereby to provide a lost-motion connection between the cam and lever.

10. A locking mechanism as in claim 9, wherein the normally fixed fulcrum includes a stud guided for limited longitudinal movement parallel to the rod, and a lost-motion pivotal connection between such stud and the cramping lever enabling limited lost-motion movement of the cramping lever without movement of the stud, the retaining means comprising a spring urging said stud in the sense to swing the cramping lever into rod-retaining position, but yieldable in the opposite sense, and stop means limiting such spring-urged movement of the stud.

11. A locking mechanism as in claim 10, and a second spring, substantially weaker than the retaining means spring and tending to swing the cramping lever about the fulcrum cam in the sense opposite to that in which the retaining means spring urges the stud.

RAYMOND FRED TATOM.

REFERENCES CITED

The following references are of record in the file of this patent:

UNITED STATES PATENTS

| Number | Name | Date |
|---|---|---|
| 991,241 | Rae | May 2, 1911 |
| 1,090,726 | Lacy | Mar. 17, 1914 |
| 1,213,779 | Sauvage | Jan. 23, 1917 |
| 1,606,840 | Koenigkramer | Nov. 16, 1926 |
| 1,821,298 | Ferreira | Sept. 1, 1931 |
| 2,341,465 | Monnot | Feb. 8, 1944 |
| 2,409,316 | Rogers | Oct. 15, 1946 |